No. 772,647. PATENTED OCT. 18, 1904.
T. A. EDISON.
PHOTOGRAPHIC FILM FOR MOVING PICTURE MACHINES.
APPLICATION FILED MAR. 5, 1903.
NO MODEL.
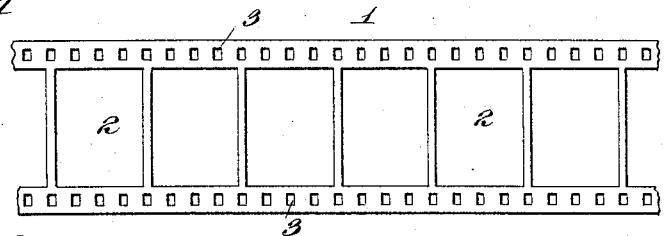
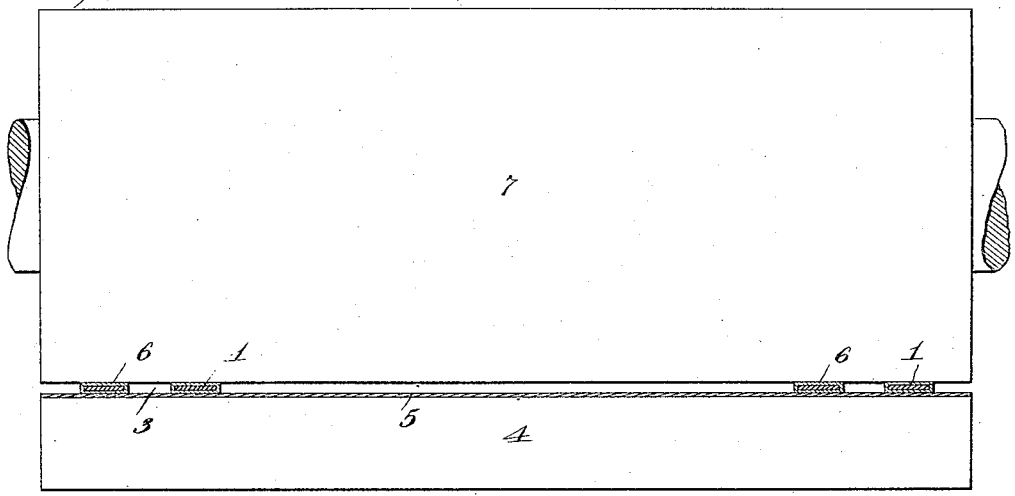
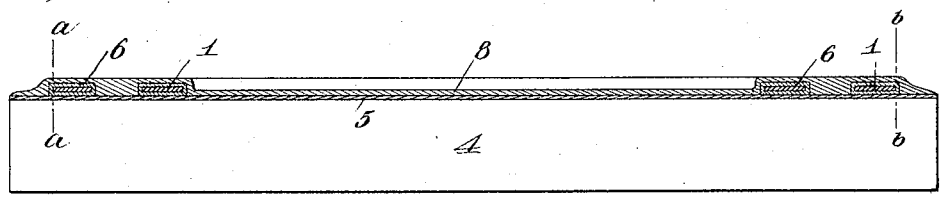
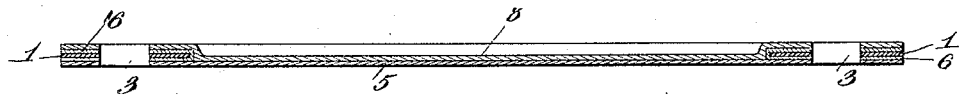
Witnesses:
Jas. F. Coleman
Jno. Robt Taylor
Inventor
Thomas A Edison
by Dyer Edmonds & Dyer
Attorneys No. 772,647. Patented October 18, 1904.

UNITED STATES PATENT OFFICE.

THOMAS A. EDISON, OF LLEWELLYN PARK, NEW JERSEY.

PHOTOGRAPHIC FILM FOR MOVING-PICTURE MACHINES.

SPECIFICATION forming part of Letters Patent No. 772,647, dated October 18, 1904.

Application filed March 5, 1903. Serial No. 146,343. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Photographic Films for Moving-Picture Machines, of which the following is a description.

My invention relates to an improved photographic film for moving-picture machines adapted for use in the taking of negative photographs in a kinetographic apparatus or for receiving positive prints from a negative for subsequent exhibition in a kinetoscopic apparatus.

My objects are:

First. To provide an improved photographic film for this purpose which is superior to the films as heretofore used, since the collodion or other analogous layer for carrying the sensitized coating is much thinner than heretofore, so as to thereby offer less obstruction to the light both in taking and in exhibiting photographs.

Second. To materially reduce the cost of manufacture of these films, which I effect by the provision of a film in which very much less collodion or analogous material is necessary. Heretofore the cost of the collodion has been a considerable factor of expense in the manufacture of photographic films, and this I have very greatly reduced, since with my film it becomes possible to make a satisfactory article in which only one-tenth of the collodion as heretofore used is necessary.

Third. To provide a photographic film which shall be very much more durable than the films as heretofore constructed. With photographic films for use in moving-picture apparatus durability is a very great desideratum, since the intermittent feed movement to which the films are subjected results in their being quickly injured. Heretofore in order that the films may be reasonably durable they have had to be made relatively thick, which not only prevents the securing of the best results in taking and exhibiting the photographs, but also adds very largely to the expense.

To effect these objects, the invention consists of a composite photographic film composed of a strip of a sufficiently-flexible metal, preferably low-carbon steel, perforated with a series of openings or windows therein and having also, if desired, one or more lines of feed-holes, by which the film may be fed in the taking or exhibiting machine, said strip receiving a thin layer of collodion or analogous material adapted to carry a sensitized coating. When such a film is used for the taking of photographs of an animate scene, a series of negatives will be formed on the sensitized coating coincident with the openings or windows in the metallic strip, or if used as an exhibiting-film a series of positive photographs suitably developed and fixed will be carried by the sensitized coating coincidently with these openings or windows in the metallic strip, all as will be more fully hereinafter described and claimed.

In order that the invention may be better understood, attention is directed to the accompanying drawings, forming a part of this specification, and in which—

Figure 1 is an elevation of the metallic strip provided with openings or windows therein and formed with two lines of feed-holes, by which the strip is fed in a taking or exhibiting machine; Fig. 2, a sectional view, on an enlarged scale, illustrating the preferred manner of cementing the metallic strip to the collodion film; Fig. 3, a corresponding view illustrating the metallic strip cemented to the film and carrying the sensitized coating, and Fig. 4 a sectional view of the complete article.

In the views corresponding parts are represented by the same numerals of reference.

The metallic strip 1 is formed preferably of very thin steel low in carbon and is provided with a series of openings or windows 2 cut therein as close together as may be desired. If the film is to be used in a taking or exhibiting machine in which the feed apparatus requires the film to be provided with one or two series of feed-holes, these holes 3 may be formed in the strip near one or both of its sides, as shown.

In manufacturing the improved photographic films I provide a long surface or table 4, composed, preferably, of glass, and I coat the same with a thin stratum 5 of a suitable tough transparent material, preferably gun-cotton collodion dissolved in amyl acetate and which is allowed to dry. The steel strip 1 is drawn through a thin solution of collodion in amyl acetate and allowed to dry, so that a coating 6 of collodion will be formed thereon. The collodion layer 5 is now moistened with a suitable solvent, such as amyl acetate, and the steel strip 1 with its collodion coating is laid thereon, after which a heavy roller 7 is passed over the strip, as shown in Fig. 2, so as to press the same tightly upon the collodion film 5. This pressure causes the films 5 and 6 to be tightly cemented together, so as to practically incorporate the steel strip with the film 5, as will be understood. After the solvent has evaporated a suitable emulsion, such as gelatin and silver salts, is flowed over the strip to form a sensitized layer 8 (see Fig. 3) for receiving the photographs. After this sensitized coating is applied the film as a whole is cut along the lines $a\ a$ and $b\ b$ and is removed from the glass surface 4. The feed-holes 3 are now reperforated through the layers 5, 6, and 8, and the film is then ready for use.

Owing to the extreme thinness of the collodion layer 5, the cost of the film is greatly reduced, while at the same time its capacity for transmitting light is materially increased. Furthermore, by employing a film having a metallic strip incorporated therewith the article, so far as strength and durability are concerned, is far superior to the films as now used, in which the sensitized coating is carried alone by a body of transparent material.

Having now described my invention, what I claim is—

1. A composite film adapted to receive a sensitized photographic coating and composed of a film of tough transparent material, and a flexible metallic strip secured thereto and provided with a series of openings or windows therein, substantially as and for the purposes set forth.

2. A composite film adapted to receive a sensitized photographic coating and composed of a film of collodion, and a flexible metallic strip secured thereto and provided with a series of openings or windows therein, substantially as and for the purposes set forth.

3. As a new article of manufacture, a photographic film comprising a body of tough transparent material, a flexible metallic strip having a series of windows or openings therein secured to the transparent body, and a sensitized coating carried by the composite film as so formed, substantially as and for the purposes set forth.

4. As a new article of manufacture, a photographic film comprising a body of collodion, a flexible metallic strip having a series of windows or openings therein secured to the transparent body, and a sensitized coating carried by the composite film as so formed, substantially as and for the purposes set forth.

5. A composite film for receiving a sensitized photographic coating, comprising a film of tough transparent material, and a flexible steel strip secured thereto and formed with a series of openings or windows therein, substantially as and for the purposes set forth.

6. A composite film for receiving a sensitized photographic coating, comprising a film of collodion, and a flexible steel strip secured thereto and formed with a series of openings or windows therein, substantially as and for the purposes set forth.

7. A composite film for receiving a sensitized photographic coating, comprising a film of tough transparent material, and a flexible metallic strip embedded therein and formed with a series of openings or windows therein, substantially as and for the purposes set forth.

8. A composite film for receiving a sensitized photographic coating, comprising a film of collodion, and a flexible metallic strip embedded therein and formed with a series of openings or windows therein, substantially as and for the purposes set forth.

9. A composite film for receiving a sensitized photographic coating, comprising a film of tough transparent material, a flexible metallic strip having a series of windows or openings therein, and a film of tough transparent material carried by the metallic strip and cemented to the first-mentioned film, substantially as and for the purposes set forth.

10. A composite film for receiving a sensitized photographic coating, comprising a film of collodion, a flexible metallic strip having a series of windows or openings therein, and a film of collodion carried by the metallic strip and cemented to the first-mentioned film, substantially as and for the purposes set forth.

11. A composite film for receiving a sensitized photographic coating, comprising a film made of tough transparent material having feed-holes therein, and a flexible metallic strip formed with a series of openings or windows secured to said film and formed with feed-holes corresponding to the feed-holes in the film, substantially as and for the purposes set forth.

12. A composite film for receiving a sensitized photographic coating, comprising a collodion film having feed-holes formed therein, and a flexible steel strip formed with a series of openings or windows and having feed-holes corresponding to the feed-holes in the film, substantially as and for the purposes set forth.

This specification signed and witnessed this 30th day of January, 1903.

THOMAS A. EDISON.

Witnesses:
J. F. RANDOLPH,
FRANK L. DYER.